Patented June 9, 1942

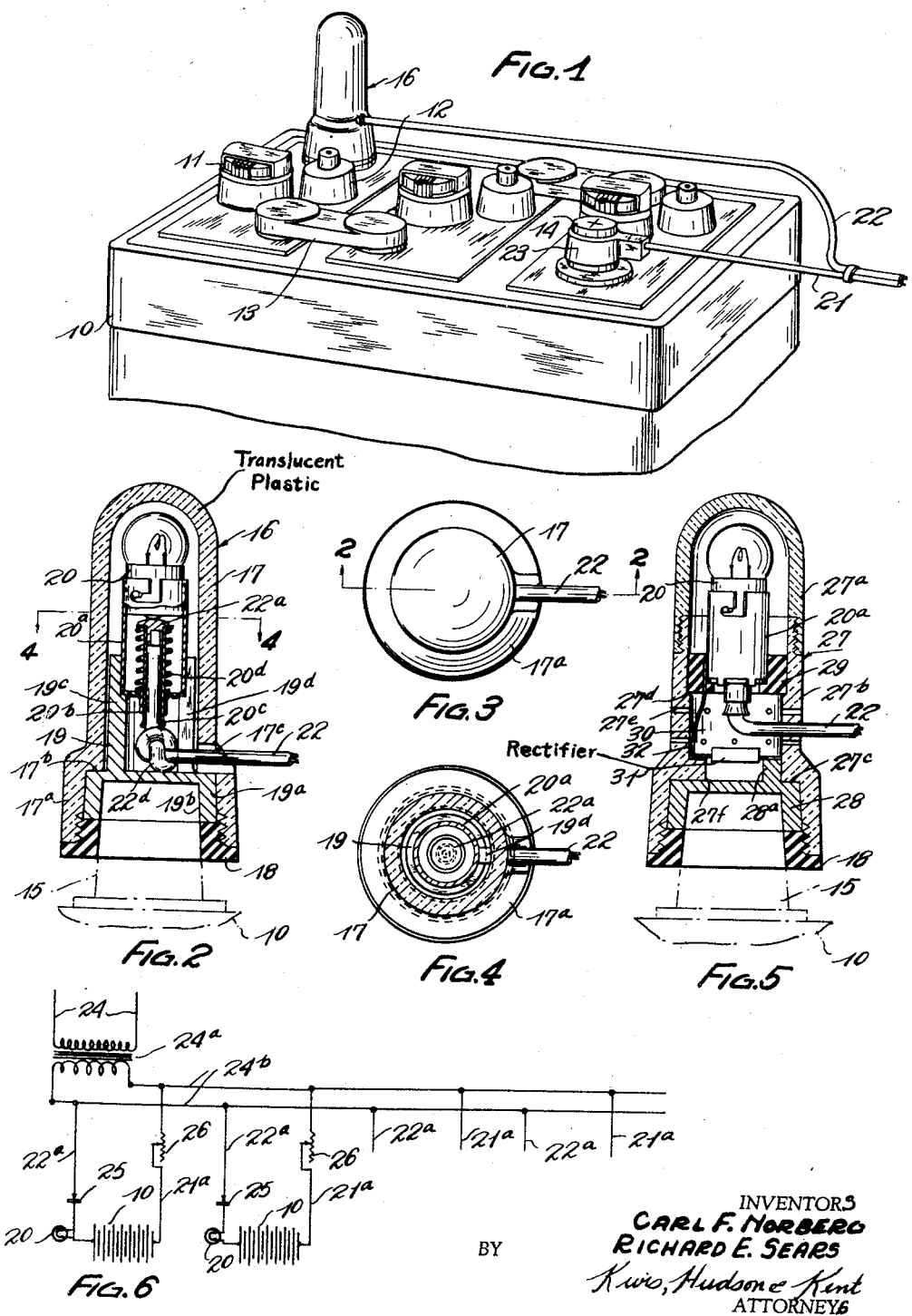

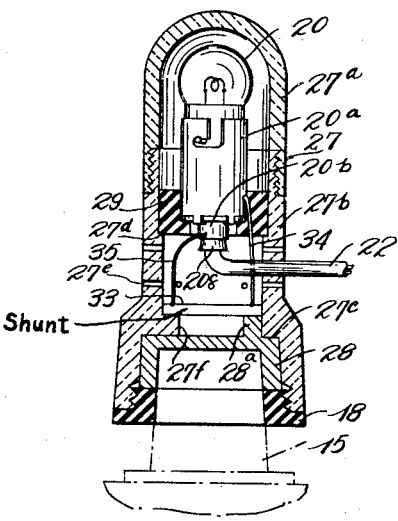
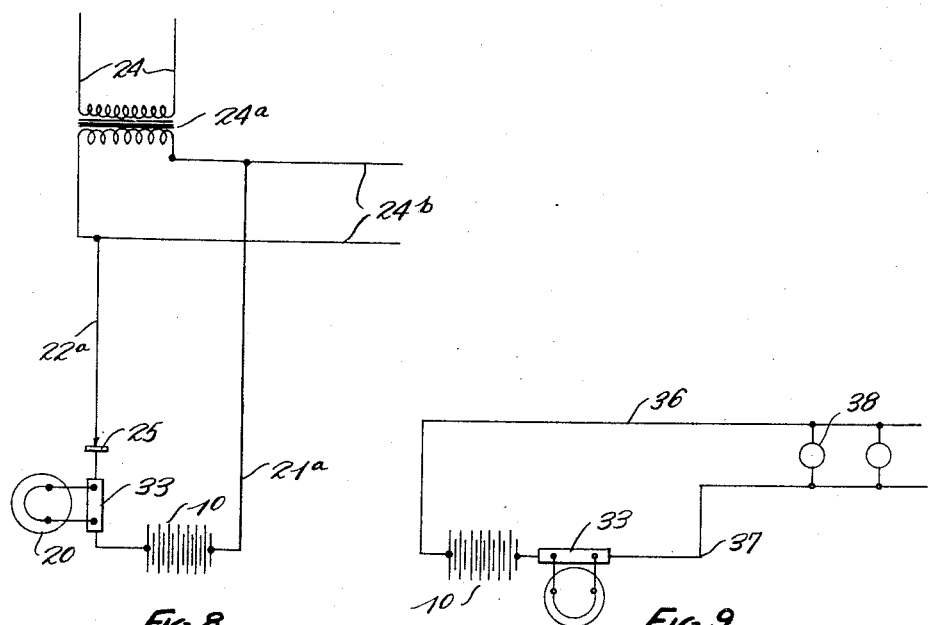

2,286,101

UNITED STATES PATENT OFFICE 2,286,101

TERMINAL PLUG

Carl F. Norberg, Shaker Heights, and Richard E. Sears, Cleveland, Ohio, assignors to Willard Storage Battery Company, Cleveland, Ohio, a corporation of West Virginia Application April 11, 1940, Serial No. 329,138

5 Claims. (Cl. 177—311)

This invention relates to a terminal plug which is adapted particularly for application to the terminal of a storage battery and which has incorporated therein a pilot or indicating lamp suitably connected with the part of the plug which electrically contacts the terminal of the battery to give a visual indication that the circuit in which the battery is located is functioning.

The terminal plug embodying our invention is adapted to be applied to a terminal of a storage battery as a part of a battery charging circuit or in a circuit where current is delivered by the battery to a current consuming device. In either case, i. e., whether the battery is delivering current or is receiving current from a charging circuit, the indicating lamp, by being made a part of the terminal plug, is in effect applied directly to the battery and thus gives a more definite and positive indication that a particular battery is functioning in either of the capacities mentioned above, and avoids the likelihood of confusion and error should the electrical system involved include several batteries and should the indicating lamps be located at a distance from the batteries; and even if the system involves a single battery, the location of the lamp at the battery is useful particularly if the battery is located at a distance from the other equipment with which the battery is connected.

The terminal plug embodying the present invention is in the form of a self-contained unit including an insulating support, preferably in the form of a housing or casing, which may be formed wholly or partly of translucent material and in which are mounted both a terminal adapted to be fitted onto the battery terminal and the indicating lamp with the lamp preferably surrounded by a translucent portion of the casing. The socket portion for the lamp may be directly fitted to the terminal of the plug, in which case the current will be conducted to or from the battery directly through the lamp, the terminal of the plug and the terminal of the battery with the three members serially contacting one another without the need for any interposed or connecting conductors.

Several alternative constructions may be employed. For example, if the terminal plug is to be used in a battery charging circuit, we may incorporate also in the casing or housing of the plug a rectifying unit which may also be serially connected with the three parts above mentioned and may be arranged between the terminal member of the plug and the lamp. With the latter construction the rectifier is preferably of the so-called dry disk type and of a size so as not to any appreciable extent enlarge the size of the plug.

Furthermore, if the battery is receiving or delivering current under high or fairly high wattage conditions, as, for example, if the ampere values are higher than the value adapted for a small lamp, the full current passing to or from the battery is preferably not passed through the lamp for otherwise a larger lamp would be required than is necessary for indicating or signalling purposes. Under these conditions it is desirable that only a portion of the current delivered be passed through the lamp, and this is accomplished by connecting the lamp in a shunt circuit by means of a shunt to which the terminals of the lamp are connected and having a resistance such that the desired fraction or portion of the current is diverted through the lamp. In accordance with the present invention we may incorporate the shunt in the terminal plug and thus obtain a much higher degree of compactness and simplicity in the exposed connections than would be the case if the shunt were located in the circuit exteriorly of the plug.

The invention may be further briefly summarized as consisting in certain novel details of construction and combinations and arrangements of parts which will be described in the specification and set forth in the appended claims.

In the accompanying sheet of drawings wherein we have illustrated the preferred construction and also certain modifications, Fig. 1 is a perspective view of a storage battery to the terminals of which are connected two terminals, one of which constitutes our improved terminal plug;

Fig. 2 is a vertical sectional view through the preferred form of the plug on an enlarged scale, with the plug applied to one of the battery terminals, the section being taken substantially along the line 2—2 of Fig. 3;

Fig. 3 is a top plan view on an enlarged scale;

Fig. 4 is a transverse sectional view on an enlarged scale, the view being taken substantially along the line 4—4 of Fig. 2;

Fig. 5 is a view similar to Fig. 2 showing a modification;

Fig. 6 is a diagrammatic view showing a preferred arrangement of circuits for simultaneously charging a plurality of batteries each of which circuits is adapted to be connected to the terminals of a battery by terminal members one of which is our improved terminal plug.

Fig. 7 is a view similar to Figs. 2 and 5 showing a further modification;

Fig. 8 is a diagrammatic view similar to Fig. 6 but illustrating the modification shown in Fig. 7 wherein a shunt is utilized so as to divert or shunt around the lamp a portion of the current being supplied to a battery being charged; and Fig. 9 is a diagrammatic view showing the use of a shunt associated with the pilot light of the terminal plug but utilized in a circuit wherein the battery is employed to supply current to one or more current consuming devices.

Referring to the drawings, 10 represents a storage battery which may be of conventional or standard form, the battery here illustrated having three cells and being of the type customarily employed in the starting and lighting equipment of motor vehicles. However, the battery may have any number of cells and may be of any suitable or desired construction. It will be sufficient to state that the battery here shown has filler plugs 11, separate vents 12, intercell connectors 13, and two terminals 14 and 15. In this instance, the terminal 14 is the positive terminal and the terminal 15 is the negative terminal, and although it is not essential that such be the case, the negative terminal is in this instance adapted to receive the charging plug involving our invention, the plug being designated as a whole by the reference character 16. As is customary, both the positive and the negative terminals 14 and 15 are slightly tapered and the positive terminal is made larger than the negative. The terminal plug may be and preferably is so constructed and designed that it can be fitted only onto the negative terminal, thus making it impossible to improperly connect the terminals of the circuit to the terminals of the battery for reasons which will be referred to presently.

Referring now to Figs. 1 and 2, it will be seen that the terminal plug 16 is of tubular form with a slightly enlarged base or lower portion and that it includes a tubular casing 17. All or the major portion of the casing is formed from translucent or transparent insulating material, preferably a suitable translucent plastic. For convenience in assembling the parts of the charging plug, the casing 17 is made in two parts the major portion being formed of the translucent plastic and the bottom being a nut 18 which may be formed of hard rubber or other suitable insulating material, this nut being adapted to be screwed into the internally threaded part of the bottom of the enlarged portion 17a of the casing 17.

Secured inside the casing 17 of the terminal plug is a terminal member 19 which is formed of good conducting material such as lead or antimonial lead which is the material of which the battery terminals 14 and 15 are formed. This terminal member 19 has a somewhat enlarged lower end 19a which is fitted in the enlarged portion 17a of the casing 17, and it is clamped in place between the upper end of the nut 18 and an internal shoulder 17b of the casing 17. This portion of the terminal member has a tapered socket 19b and the bore of the nut 18 is tapered in conformity with the taper of the wall of the socket 19b and the taper of these two members corresponds to the taper of the battery terminal 15, and their relative sizes are such that the lower socketed end of the plug can be fitted down onto the terminal 15 in a manner such that a good electrical connection is made between the upper end of the battery terminal and the socket portion of the plug terminal, as indicated in Fig. 2.

With the form of our invention illustrated in Figs. 2, 3 and 4, the terminal member 19 is provided above the socket 19b with an upstanding tubular extension 19c, and frictionally fitted into the upper end of this tubular extension 19c of the plug terminal is a metallic shell or socket 20a of an indicating lamp 20. The lower end of the shell is tightly fitted into the upper end of the tubular extension 19c of the terminal 19 so that a low resistance connection is established between these two parts. The lamp proper is located at the upper part of the casing 17 and the base of the lamp has in this instance a bayonet-slot type of connection with the shell or socket 20a.

The terminal member 19 and the lamp 20 may be inserted in the casing 16 before the nut 18 is applied, and when the nut is screwed into place it clamps the terminal member in position and holds the terminal member and the lamp in their proper positions coaxially of the terminal plug. When the nut is removed the terminal member 19 and the lamp 20 can be removed as a unit from the casing 16.

In Fig. 1 the current conveying conductors connected to the terminals of the battery are designated 21 and 22. These conductors may be the conductors of a circuit to which current is supplied by the battery and which contains one or more current consuming devices or they may be the conductors of a battery charging circuit. In this instance the conductor 21 is connected to a terminal 23 which is in the form of a sleeve with a conical bore adapted to fit frictionally tight on the tapered surface of the positive battery terminal 14. The other conductor 22 is connected to the terminal member 19 of our improved terminal plug through the lamp. The details of the connection with the lamp are immaterial to the present invention, but in this instance the conductor 22 extends through an opening 17c in the lower part of the translucent casing 17 and through a vertical slot 19d of the tubular portion 19c of the terminal member 19 of the plug. The shell or socket 20a of the lamp is closed at the bottom by an insulating disk and in this disk is fitted a short tube 20b, and in this tube is slidable a longer tube 20c through which the conductor 22 extends. To the upper end of the conductor there is secured a terminal 22a which is flared over the upper end of the tube 20c, and this terminal is engaged by the bottom or insulated contact at the end of the base of the lamp 20. A spring 20d surrounds the tube and holds the terminal 22a firmly against the insulated contact of the base of the lamp, the proportions being such that the spring is compressed when the lamp is inserted in the socket. The conductor 22 is shown as provided with a strain-relieving knot 22d adapted to engage the inner wall of the tubular portion 19c of the terminal 19, this being for the obvious purpose of preventing the conductor from being accidentally disengaged from the socket of the lamp. The slot 19d is provided in the tubular extension of the terminal 19 to facilitate the assembly of the parts of the lamp including the conductor 22.

It was previously mentioned that it is impossible to improperly connect the terminals of the circuit conductors, such as the conductors 21 and 22, to the terminals of the battery. This result is accomplished by reason of the fact that the tapered socket provided in the lower end of the terminal plug and formed partly in the nut 18 and partly in the terminal member 19 of the plug will fit onto or receive only the smaller of the two battery terminals, in this instance, the negative terminal 15. Should it be attempted to apply the terminal plug to the positive terminal, the upper end of this terminal would not only be too large to be received in the socket of the plug but it would engage only the insulating nut 18 and could not contact any portion of the terminal member 19 since the socketed portion thereof is located inwardly a distance from the lower end of the plug including the insulating nut 18.

It was previously pointed out that our improved terminal plug may be employed as a part of a circuit receiving current from the battery or as a part of a charging circuit, and in Fig. 6 we have shown diagrammatically a charging system or charging equipment for simultaneously charging a plurality of batteries. In this instance, as is usually the case, an alternating current source is employed the conductors of which are designated by the reference character 24, these being connected to the primary of a step-down transformer 24a having secondary conductors 24b to which one or more batteries 10 are connected by conductors designated 21a and 22a. It is immaterial to our invention in its broader aspects whether a single rectifier is employed for the group of batteries being charged or whether there is a separate rectifier for each battery. Assuming that a separate rectifier is employed with each battery, it is also immaterial to our invention, particularly with the forms of the invention illustrated in Figs. 1 to 4 and in Figs. 7 and 8, what type of rectifier is employed. We contemplate using rectifiers of the bulb type and rectifiers of the dry disk type which latter type, as is well known, includes a pair of disks faced with copper oxide, copper sulphide, selenium, and the like, or other types of rectifiers may be employed.

In Fig. 6 we have shown, by way of example only, a separate rectifier here designated 25 for each battery and in each battery charging circuit there will be employed one of our improved charging plugs adapted to be connected to the negative terminal of the battery, as previously described, each plug including one of the indicating or pilot lamps 20 which together with the rectifier 25 are shown connected to the conductor 22a associated with each battery. In each of these battery charging circuits there may also be included, if desired, an adjustable resistance 26 here shown as located in the conductor 21a associated with each battery, the function of this adjustable resistance being to enable the current and voltage conditions of the different charging circuits to be independently adjusted.

If small rectifiers of the dry disk type are employed, it is practicable and may be desirable to incorporate the rectifier as well as the indicating lamp in the terminal plug, and one way of accomplishing this result is illustrated in Fig. 5. In Fig. 5 the casing or housing of the terminal plug is designated by the reference character 27 and, as with the construction shown in Fig. 2, it is formed mainly of translucent insulating material such as a suitable translucent plastic, but in this instance the plastic portion of the casing is for convenience of assembly formed in two sections, namely, an upper section 27a which encloses a lamp 20 and a lower section 27b, the two sections as illustrated in Fig. 5 being connected together by engaging threaded portions. As with the construction shown in Fig. 2, the lower part of the casing is formed by a threaded nut 18 of rubber or the like which is screwed into the enlarged lower part of the casing. Above the nut and clamped between it and a shoulder 27c of the casing is a terminal 28 (corresponding to the terminal 19 of Fig. 2) which, as before, has a tapered socket on its lower side which is adapted to be fitted onto battery terminal 15.

The base of the lamp 20 is fitted into the lamp socket 20a which may be identical with the socket illustrated in section in Fig. 2, but in this instance the socket is supported by an insulating partition 29 extending across the section 27b of the casing and resting on an internal shoulder 27d thereof. The conductor 22 of the charging circuit is shown as extending through an opening in the member 27b of the casing, and it may be connected to the lamp in the manner illustrated in Fig. 2. In Fig. 5 the terminal 28 does not have an upstanding tubular extension to engage the lamp socket as in Fig. 2, and in this instance between the upper end of the terminal 28 and the transverse insulating partition 29 which supports the lamp there is a chamber 30 in the lower part of which is supported a rectifier which is shown conventionally at 31 and which, as previously brought out, is preferably of the dry disk type. As some heat is given off by the rectifier, the cylindrical wall of the chamber 30 may be provided with a number of ventilating openings 27e.

In this instance, the rectifier 31 extends between and is supported by a shoulder 28a projecting upwardly from the top of the plug terminal 28 and a shoulder 27f formed on the section 27b of the casing and projecting inwardly over the top of the plug terminal 28. Thus it will be seen that the rectifier 31 is located between the plug terminal 28 and the lamp, and in this instance one terminal of the rectifier rests upon and may be secured by solder or otherwise to the shoulder 28a of the plug terminal and the other terminal of the rectifier projects over the internal shoulder 27f of the casing member 27b and is connected by a conductor 32 to the shell or socket 20a of the lamp. Thus the charging current passes between the battery terminal and the conductor 22 serially through the plug terminal, the rectifier and the lamp.

In Fig. 6 we have illustrated the arrangement of the lamp and plug terminal as in the preferred construction of Fig. 2, and in that case the rectifier 25 may be located at any suitable point in the charging circuit for the battery being charged. Of course, with a charging circuit utilizing a charging plug as illustrated in Fig. 5, the rectifier will be located between the battery and the lamp.

It was previously pointed out that when the plug is to be used in a circuit delivering current of high or fairly high wattage conditions, it may be desirable to have only a portion of the current pass through the lamp by the use of a shunt which may be located in the circuit and to which the terminals of the lamp may be connected. It was also stated that in accordance with our invention we may incorporate the shunt in the terminal plug. We have illustrated this construction in Fig. 7 to which reference will now be had. In this instance, the housing and the terminal member of the plug are constructed in the same manner as shown in Fig. 5 and the lamp is mounted in the same way as illustrated in that figure. Accordingly, these parts need not be described in detail, and the reference characters of Fig. 5 are applied to the corresponding parts of Fig. 7. In this instance, instead of providing a rectifier in the chamber 30, we provide therein a shunt 33 which as shown is supported on a shoulder 28a of the terminal member 28 and on a shoulder 27f on the lower part of the member 27b of the housing, it being understood that as illustrated one end of the shunt will be electrically and mechanically connected to the terminal member 28. As the resistance of the shunt may cause some heat to be given off, the walls of the chamber may be perforated for ventilating purposes as is the case when the rectifier is mounted in the chamber.

The conductor 22 is connected to the lamp precisely as in Figs. 2 and 5. One end of the shunt is connected by a conductor 34 to one terminal of the lamp, in this instance to the socket member 20a thereof, and the other end of the shunt is connected by conductor 35 to the other terminal of the lamp, but in this instance for convenience of illustration it is shown as connected to the tube 20b although it may be connected to the tube 20c to which the conductor 22 is electrically connected. Thus assuming that the current is passing from the conductor 22 to the battery terminal 15, a part and generally the major portion of the current will pass from the conductor 22 and will be diverted from the lamp by way of the conductor 35 and will then pass through the shunt to the terminal member 28 of the plug. A sufficient amount of current to light the lamp will pass through the lamp by way of the conductor 22 to one terminal of the lamp and from the other terminal of the lamp by way of the conductor 34 to the shunt. Of course the precise manner in which the shunt is connected to the terminal member of the plug and the connections to the lamp so that only a portion of the current will pass through the lamp are immaterial to the present invention.

As is the case with the plug shown in Fig. 2, the plug shown in Fig. 7 may be employed, either in a charging circuit for the battery or in a circuit supplied with current by the battery. In Fig. 8 it is shown in a battery charging circuit, and here the conductors and other parts corresponding to Fig. 6 are given the same reference characters as in the latter.

In Fig. 9 the shunt 33 and the lamp 20 of the terminal plug are associated with a battery designed to deliver current by way of conductors 36 and 37 to current consuming or translating devices indicated at 38. It will be understood of course that if the current values supplied to or delivered by the battery are sufficiently low, the shunt of Figs. 8 and 9 may be omitted, in which case all the current will pass through the lamp and a plug similar to that shown in Fig. 2 may be employed.

Thus with our invention we have provided a relatively small compact unit in which is incorporated a terminal which cannot be applied to the wrong terminal of the battery, and an indicating lamp. Since the lamps of the terminal plugs are in effect applied directly to the batteries, they give positive and direct information to the operator as to whether or not the electrical equipment is functioning properly. If not and if the equipment involves a number of batteries, he can tell at a glance which battery or batteries are not functioning. This is a very distinct and important advantage over equipment having indicating lamps located on a board or panel remote from the batteries.

While we have shown the preferred embodiment and two modifications, we do not desire to be confined to the precise details illustrated and described but aim in our claims to cover all modifications which do not involve a departure from the spirit and the scope of our invention.

Having thus described our invention, we claim:

1. A terminal plug for use with a storage battery comprising an elongated body formed of insulating material at least part of which is translucent, a plug terminal and a lamp electrically connected to each other and both located in said body substantially in line with each other and substantially coaxially of the body, said plug having at its lower end a socket adapted to be fitted onto one of the terminals of the battery, the lower part of said socket being formed in the insulating material forming the lower end of the body and the upper part of the socket being formed in the plug terminal.

2. A terminal plug for use with a storage battery comprising an elongated hollow body formed of insulating material, a plug terminal and a lamp electrically connected together and both located in the hollow body substantially coaxially of the latter and said body having at its lower end a tapered socket adapted to receive with a frictional fit one of the terminals of the battery, the lower part of the socket being formed in the insulating material forming the lower end of the body and the upper part of the socket being formed in the lower part of the plug terminal.

3. A terminal plug for use with a storage battery comprising an elongated hollow body formed of insulating material, a plug terminal and a lamp electrically connected together and both located in the hollow body substantially coaxially of the latter and said body having at its lower end a tapered socket adapted to receive with a frictional fit one of the terminals of the battery, the lower part of the socket being formed in the insulating material forming the lower end of the body and the upper part of the socket being formed in the lower part of the plug terminal, said body having an opening for receiving an electric conductor, said opening being located between the lamp and the socketed lower portion of the plug terminal.

4. A terminal plug for use with a storage battery comprising an elongated hollow body of insulating material, a terminal member and a lamp electrically connected together and both arranged in said body substantially in line with each other and substantially coaxially of said body, a bottom member of insulating material detachably secured to the lower end of said body and serving when in place to clamp the terminal member in position, and a socket at the lower end of the terminal plug, the lower part of the socket being formed in said bottom member and the upper part of the socket being formed in the lower part of said terminal member.

5. A terminal plug for use with a storage battery comprising an elongated hollow casing of insulating material, a terminal member and a lamp electrically connected together and both arranged in said casing substantially in line with each other and substantially coaxially of said casing, a nut of insulating material at the bottom of the terminal plug and having a threaded connection with the lower end of the casing and serving when in place to clamp the terminal member in position, and a socket formed in the lower end of the terminal plug, the lower part of the socket being formed in said nut and the upper part of the socket being formed in the lower end of the terminal member.

CARL F. NORBERG.
RICHARD E. SEARS.